(No Model.)
E. ALDOM.
SPOON.
No. 275,112. Patented Apr. 3, 1883.
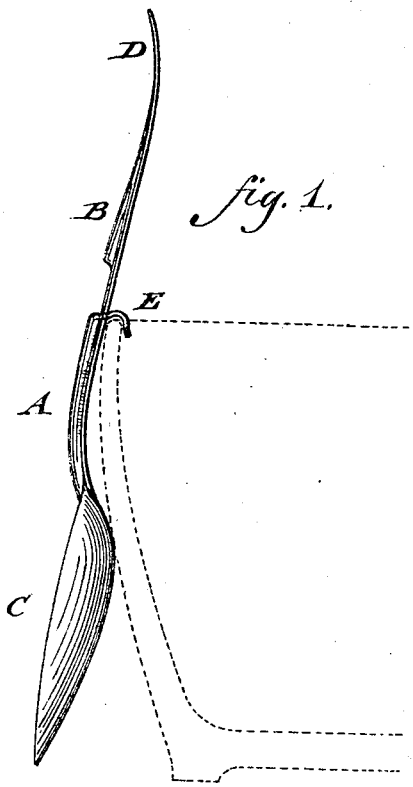
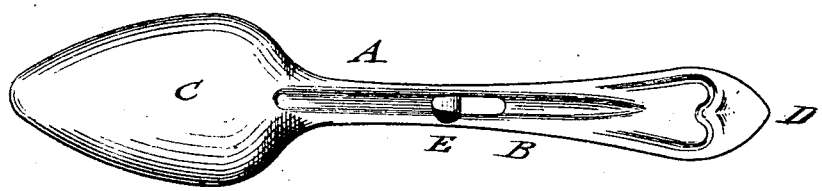
WITNESSES:
Job. N. Rosenbaum.
Otto Risch.
INVENTOR
Edward Aldom
BY Paul Goepel
ATTORNEY

UNITED STATES PATENT OFFICE.

EDWARD ALDOM, OF BROOKLYN, NEW YORK.

SPOON.

SPECIFICATION forming part of Letters Patent No. 275,112, dated April 3, 1883.

Application filed May 24, 1882. (No model.)

*To all whom it may concern:*

Be it known that I, EDWARD ALDOM, of Brooklyn, in the county of Kings and State of New York, have invented certain new and useful Improvements in Spoons and Forks, of which the following is a specification.

This invention has reference to such improvements in spoons and forks that the same may be readily hung alongside of the cooking-vessels, so as to be always within reach for use in cooking; and the invention consists of a spoon or fork the shank of which is provided at a point intermediately between the bowl or tines and the handle with a suspension-hook.

In the accompanying drawings, Figure 1 represents a side elevation of my improved spoon or fork, shown as applied to a cooking-vessel; and Fig. 2 is a rear view of the same.

Similar letters of reference indicate corresponding parts.

A in the drawings represents a spoon or fork of any suitable metal, the shank B of which is preferably stamped up in the course of manufacture at a point intermediately between the bowl or tines C and the enlarged handle D with a suspension-hook, E, by means of which the spoon or fork may be hung to the inside or outside of the cooking-vessels, as desired, so as to be instantly within reach when it is to be used during the cooking operation.

The suspension-hook may also be soldered to the shank, instead of being stamped up from the same, or applied thereto in any other suitable manner.

I am aware that ladles, spoons, and similar kitchen implements have been made with suspension-hooks at the extreme ends of the handle, and are well known, and I therefore lay no claim to the suspension-hook, broadly.

I am also aware that spoons have been provided at the handles with a hook adapted to slide on the shank; but this requires a separate attachment, while in my spoon or fork the suspension-hook is made integral therewith, being stamped out of the body of the shank.

Having thus described my invention, I claim as new and desire to secure by Letters Patent—

A spoon or fork the shank of which is provided with a suspension-hook integral therewith at a point intermediate between the bowl or tines and the handle, substantially as set forth.

In testimony that I claim the foregoing as my invention I have signed my name in presence of two subscribing witnesses.

EDWARD ALDOM.

Witnesses:
 PAUL GOEPEL,
 SIDNEY MANN.